(12) United States Patent
Jones et al.

(10) Patent No.: US 12,335,724 B2
(45) Date of Patent: Jun. 17, 2025

(54) METHODS, TERMINAL AND SERVER FOR ENABLING SIGN-INS

(71) Applicants: David Jones, Forest Hill (AU); Kiki Tanousis, Forest Hill (AU)

(72) Inventors: David Jones, Forest Hill (AU); Kiki Tanousis, Forest Hill (AU)

( * ) Notice: Subject to any disclaimer, the term of this patent is extended or adjusted under 35 U.S.C. 154(b) by 254 days.

(21) Appl. No.: 18/166,349

(22) Filed: Feb. 8, 2023

(65) Prior Publication Data

US 2023/0188985 A1 Jun. 15, 2023

Related U.S. Application Data

(63) Continuation-in-part of application No. 18/059,575, filed on Nov. 29, 2022, now abandoned, which is a continuation-in-part of application No. PCT/AU2021/050525, filed on May 28, 2021.

(30) Foreign Application Priority Data

May 29, 2020 (AU) .............................. 2020901763

(51) Int. Cl.
*H04W 12/06* (2021.01)
*H04W 4/021* (2018.01)

(52) U.S. Cl.
CPC ........... *H04W 12/06* (2013.01); *H04W 4/021* (2013.01)

(58) Field of Classification Search
CPC ........ H04W 12/06; H04W 4/021; H04L 63/08
See application file for complete search history.

(56) References Cited

U.S. PATENT DOCUMENTS 8,510,138 B2 * 8/2013 Marti ..................... G06Q 10/02
705/37
8,910,274 B2 12/2014 Sanders
9,697,650 B2 * 7/2017 Nakfoor .................. G07C 9/38
(Continued)

FOREIGN PATENT DOCUMENTS

EP 3617973 A1 3/2020
WO WO2012096749 A2 7/2012

OTHER PUBLICATIONS

The file combined with (ISA/210) International Search Report and (ISA/237) Written Opinion of the International Searching Authority, uploaded on Dec. 2, 2021.

*Primary Examiner* — Boris D Grijalva Lobos
(74) *Attorney, Agent, or Firm* — NGUYEN TARBET IP LAW

(57) ABSTRACT

There is disclosed a method of enabling sign-ins by a terminal in communication with a server located at a different location when compared to the terminal, the method comprising: in response to capturing a mobile device identifier displayed by a mobile device, determining whether or not the displayed mobile device identifier matches a visual identifier based on the captured identifier; upon determining that the displayed mobile device identifier matches the visual identifier, transmitting first sign-in information from the terminal to the server; in response to receiving a server identifier transmitted from the server, wherein the server identifier is generated by the server in response to receipt of the first sign-in information, displaying the received server identifier; and in response to receiving second sign-in information transmitted from the server, displaying a notification indicating a sign-in.

17 Claims, 2 Drawing Sheets

(56) References Cited

U.S. PATENT DOCUMENTS

| | | | |
|---|---|---|---|
| 2014/0282961 A1* | 9/2014 | Dorfman | G06Q 20/3276 |
| | | | 726/7 |
| 2014/0358594 A1* | 12/2014 | Antonakakis | G07C 9/22 |
| | | | 705/5 |
| 2021/0182921 A1* | 6/2021 | Onkels | G06Q 30/0621 |

* cited by examiner

METHODS, TERMINAL AND SERVER FOR ENABLING SIGN-INS

RELATED APPLICATION

This application is a continuation-in-part and claims benefit of Ser. No. 18/059,575 filed Nov. 29, 2022 which is a continuation-in-part and claims benefit of Australian PCT Application No. PCT/AU2021/050525 filed May 28, 2021, and claims benefit of Australian Provisional Patent Application No. 2020901763 filed May 29, 2020, the specification(s) of which is/are incorporated herein in their entirety by reference.

FIELD

The present invention relates to a method, a terminal, and a server of a system for enabling sign-ins and is particularly but not exclusively applicable to one for electronically signing-in visitors to sites.

BACKGROUND

Systems for recording visitor sign-ins are known. For example, an existing system involves issuing to each visitor a ticket comprising a barcode (or some other unique identifier such as a Quick Response (QR) code) such that when the visitor is on-site, the barcode on the ticket can be scanned at a terminal (for example, an electronic kiosk) to sign-in the visitor. One implementation can be found at airports where tickets in the form of boarding passes are first issued to passengers at check-in counters and then scanned at boarding gates just before boarding.

In the past, each passenger must typically present himself or herself at a check-in counter at an airport together with specific documentation (such as a passport) before a check-in attendant at the check-in counter will print out a boarding pass that permits the passenger to enter a departure gate at the airport and board a flight. More recently, a passenger can instead be issued with an electronic boarding pass, for example, at the time a flight ticket is purchased without presenting himself or herself at a check-in counter. Accordingly, a person forging the identity of a passenger may use an electronic boarding pass that was issued to the passenger at the time a ticket for a flight is purchased and board the flight in place of the passenger.

There is a need for an improved or alternative approach for electronically signing-in visitors.

SUMMARY OF THE INVENTION

In a first aspect, the present invention provides a method of enabling sign-ins by a terminal in communication with a server located at a different location when compared to the terminal, the method comprising:
  in response to capturing a mobile device identifier displayed by a mobile device, determining whether or not the displayed mobile device identifier matches a visual identifier based on the captured identifier;
  upon determining that the displayed mobile device identifier matches the visual identifier, transmitting first sign-in information from the terminal to the server;
  in response to receiving a server identifier transmitted from the server, wherein the server identifier is generated by the server in response to receipt of the first sign-in information, displaying the received server identifier; and
  in response to receiving second sign-in information transmitted from the server, displaying a notification indicating a sign-in.

In an embodiment of the method of enabling sign-ins by the terminal, the visual identifier corresponds to a user of the mobile device, and
  determining whether or not the displayed mobile identifier matches the visual identifier comprises determining whether or not the captured identifier matches one of a plurality of visual identifiers corresponding to respective ones of a plurality of users.

In a second aspect, the present invention provides a method of enabling sign-ins by a server in communication with a terminal located at a different location when compared to the server, the method comprising:
  in response to receiving first sign-in information transmitted from the terminal, generating a server identifier for storage and transmitting the generated server identifier to the terminal for display to a user of a mobile device configured to display a mobile device identifier matching to a visual identifier;
  in response to receiving an identifier transmitted from the mobile device, determining whether or not the received identifier matches the stored server identifier;
  upon determining that the received identifier matches the stored server identifier, generating second sign-in information and transmitting the generated second sign-in information to the terminal.

In an embodiment of the method of enabling sign-ins by the server, the first sign-in information is associated with a visual identifier corresponding to the user of the mobile device.

In a third aspect, the present invention provides a terminal comprising:
  a transceiver for communicating with a server located at a different location when compared to the terminal;
  a camera;
  a display;
  memory for storing a visual identifier; and
  a processor configured to:
  in response to the camera capturing a mobile device identifier displayed by a mobile device, determining whether or not the displayed mobile device identifier matches the stored visual identifier based on the captured identifier;
  upon determining that the displayed mobile device identifier matches the stored visual identifier, control the transceiver to transmit first sign-in information transmitted from the terminal to the server;
  in response to the transceiver receiving a server identifier transmitted from the server, wherein the server identifier is generated by the server in response to receipt of the first sign-in information, controlling the display to display the received server identifier; and in response to the transceiver receiving second sign-in information transmitted from the server, controlling the display to display a notification indicating a sign-in.

In an embodiment of the terminal, the visual identifier corresponds to a user of the mobile device, and the processor is configured to determine whether or not the captured identifier matches one of a plurality of visual identifiers corresponding to the respective ones of a plurality of users.

In a fourth aspect, the present invention provides a server comprising:
- a transceiver for communicating with a terminal located at a different location when compared to the server;
- memory; and
- a processor configured to:
  - in response to receiving first sign-in information transmitted from the terminal, generate a server identifier for storage in the memory and control the transceiver to transmit the generated server identifier to the terminal for display to a user of a mobile device configured to display a mobile device identifier matching to a visual identifier stored by the terminal;
  - in response to the transceiver receiving an identifier transmitted from the mobile device, determine whether or not the received identifier matches the stored server identifier;
  - upon determining that the received identifier matches the stored server identifier, generating second sign-in information and controlling the transceiver to transmit the generated second sign-in information to the terminal.

In an embodiment of the server, the first sign-in information is associated with a visual identifier corresponding to the user of the mobile device.

The present invention implements the inventive feature of the mobile device identifier, or the first sign-in information, unique to a user of the mobile device. This feature contributes to an improvement in the field of sign-in terminal technology. Specifically, the mobile device identifier unique to a user of the mobile device increases the overall privacy and security of the terminal sign-in process because it prevents unauthorized parties from gaining access to tickets and entry passes owned by the user since the said tickets and entry passes are now tied only to the user's mobile device. Compared to prior systems, where a passenger is issued with an electronic boarding pass without presenting himself or herself at a check-in counter with the risk of a person forging the identity of the passenger using an electronic boarding pass that was issued to the passenger at the time a ticket for a flight is purchased and boarding the flight in place of the passenger, the present invention improves on this field by tying sign-in credentials to a mobile device that is specific to and, in the majority of situations, can only be accessed by the user.

BRIEF DESCRIPTION OF DRAWINGS

So that the invention may be more clearly ascertained, embodiments will now be described, by way of example, with reference to the accompanying drawings, in which.

DETAILED DESCRIPTION OF EMBODIMENTS OF THE INVENTION

Figure 1:
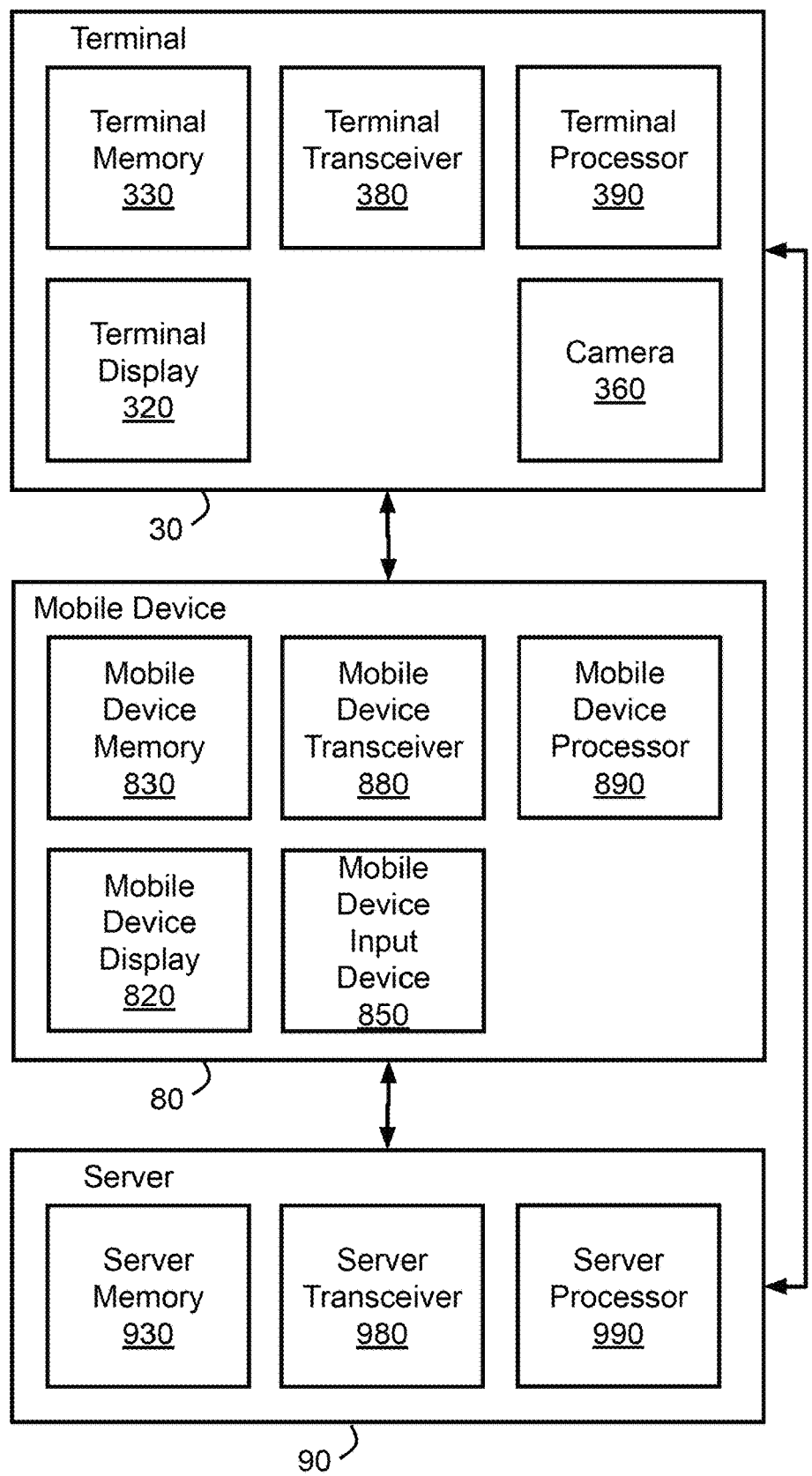
FIG. 1 is a block diagram of a system comprising a mobile device, an embodiment of the terminal, and an embodiment of the server.

There is disclosed a system comprising a mobile device 80, an embodiment of the terminal in the form of a kiosk 30, and an embodiment of the server 90. In this system, the server 90 is located at a location that is different from the location of the kiosk 30.

The terminal 30 is adapted to capture a mobile device identifier (for example, a designated "app screen") displayed by the mobile device 80 and determine whether the displayed mobile device identifier matches a visual identifier. Upon determining that the displayed mobile device identifier matches the visual identifier, the terminal 30 transmits the first sign-in information (such as visitor details) to the server 90.

The server 90 is adapted to respond to the first sign-in information transmitted from the terminal, by generating a server identifier (for example, a random code) for storage and transmitting the generated server identifier to the terminal 30 for display to a user of the mobile device 80. The terminal 30 is adapted to receive the server identifier transmitted from the server 90 and display the received server identifier.

The server 90 is adapted to, after transmitting the server identifier to the terminal 30, determine whether or not an identifier subsequently received from the mobile device 80 matches the server identifier previously stored by the server 90. Upon determining that the received identifier matches the stored server identifier, the server 90 generates second sign-in information (which may simply be an indication of a successful sign-in) and transmits the generated second sign-in information to the terminal 30. The terminal 30 is adapted to display an indication corresponding to a sign-in in response to receiving the second sign-in information transmitted from the server 90.

In an embodiment of the system, the mobile device 80 may be used by a passenger to purchase a ticket for a flight. The flight ticket can then be displayed by the mobile device 80 at the terminal or kiosk 30 before the passenger is permitted to board the flight. Because the mobile device 80 that is used to purchase the ticket must then be used to both display the mobile device identifier at the kiosk 30 and transmit to the server 90 the server identifier that is displayed at the kiosk 30, any person (for example, the passenger) who wants to use the ticket to board the flight must not merely have control of the mobile device 80 but also be present physically at the kiosk 30 with the mobile device 80.

A person skilled in the art will appreciate that this approach to signing in a passenger for a flight is contactless in that the passenger need not touch any device (such as the kiosk 30) other than the passenger's mobile device 80 in order to sign in. That is, it is envisaged that the terminal 30 is advantageous when compared to known terminals in that the terminal 30 enables contactless sign-ins.

FIG. 1 is a block diagram showing further details of the system comprising the mobile device 80, the terminal 30, and the server 90. It is envisaged that the mobile device 80 is typically a smartphone, and comprises a display 820 such a touch screen, memory 830 such as on-circuit flash memory, an input device 850 such as the touch screen, a transceiver 880 and a processor 890, for example, a mobile System on Chip (SoC). A person skilled in the art will appreciate that the mobile device 80 may be any suitable device that can be carried by a user from one location to another location, and need not necessarily be a smartphone. For example, the mobile device 80 may alternatively be a tablet device or even a laptop computer in an alternative embodiment.

It is envisaged that the terminal 30 is typically some form of kiosk or terminal that can be physically installed or placed at a location that is suitable for use by multiple people, not merely a user of the mobile device 80. For example, the terminal 30 may be a kiosk that is placed at boarding gates of airports. A person skilled in the art will appreciate that the terminal 30 is not limited to merely airport boarding gate kiosks, and may use any suitable device including a stand-alone personal computer that is suitably configured to perform the functions of the terminal 30. In this embodiment, the terminal comprises a display 320 such as a liquid crystal display (LCD) display, memory 330, a camera 360, a transceiver 380, and a processor 390 such as a Central Processing Unit (CPU). However, it is envisaged that the terminal 30 may comprise additional or alternative components. For example, it is envisaged that the terminal 30 may comprise an additional or alternative form of image-capturing device to the camera 360, or comprise a sensor such as a QR code reader instead of or in addition to the camera 360.

It is envisaged that the server 90 is typically a centralized device that can communicate with multiple terminals 30 simultaneously, and comprises memory 930, a transceiver 980, and a processor 990. In particular, it is envisaged that the terminal and the server 90 may be located at different locations but can be in communication with each other. It is also envisaged that the server 90 will typically be able to simultaneously communicate with multiple mobile devices including the mobile device 80 which may be carried by a user from one location to another location and can be in communication with either one or both of the kiosk 30 and the server 90 using the same or different communication technologies including wireless or wired technologies.

Depending on the embodiment, the terminal (or kiosk) 30, the server 90, and the mobile device 80 may communicate with each other using the same or different communication technologies. For example, it is envisaged that the kiosk 30 at a boarding gate will typically be connected via a Wireless Local Area (WLAN) in an airport which is then connected by way of some form of broadband connection to the server 90. In the example, the mobile device 80 may be connected to the server 90 by way of either a WLAN or a mobile network data connection provided by a cellular network provider.

Figure 2:
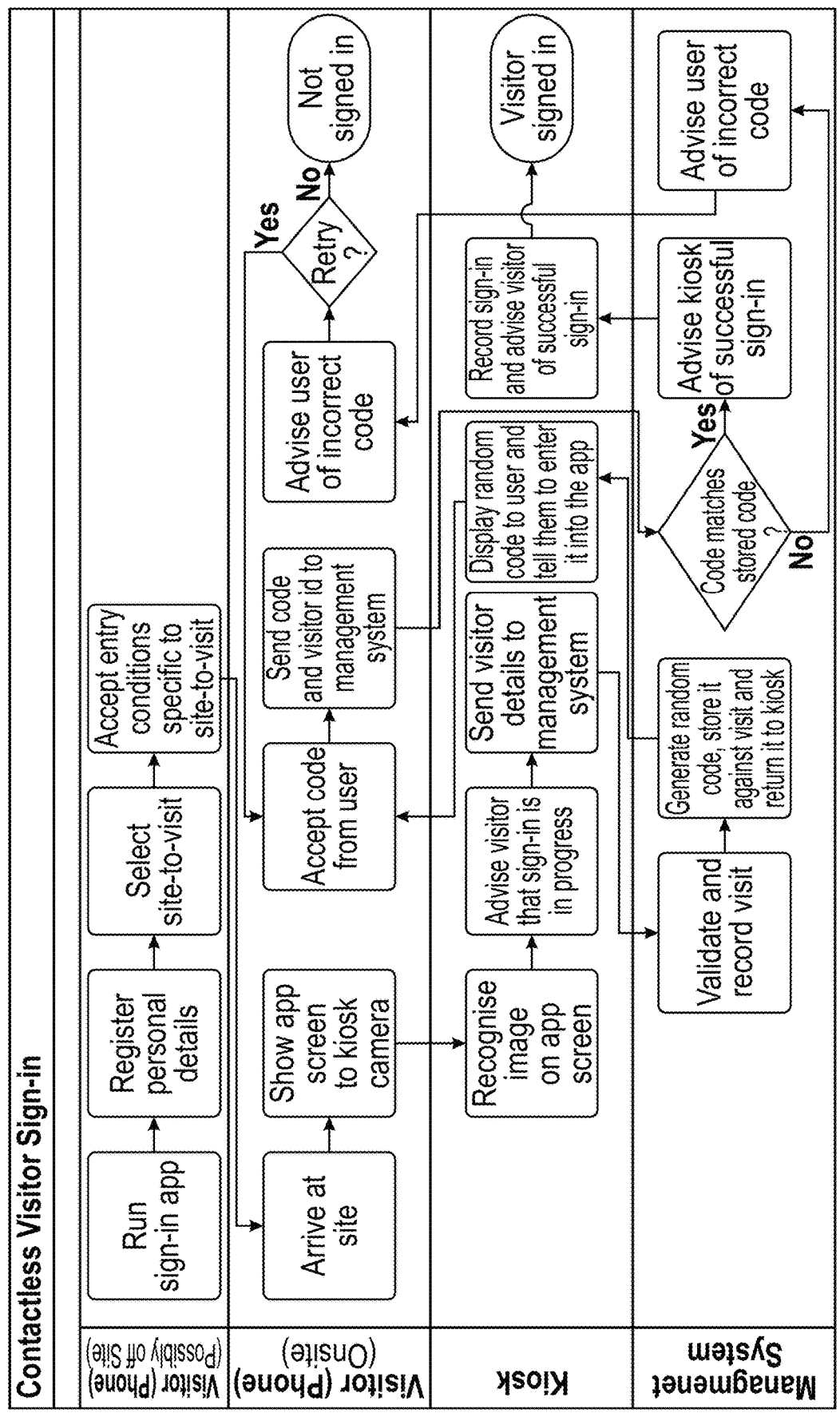
FIG. 2 is a flow diagram of methods of enabling sign-ins by the terminal and the server of FIG. 1.

FIG. 2 illustrates a flow diagram of a process involving an embodiment of a method of enabling sign-ins by the terminal 30 and an embodiment of a method of enabling sign-ins by the server 90.

The process begins with a user (a "visitor" to a site) of the mobile device (a smartphone or a "phone") 80 installing and running a designated application. It is envisaged that the designated application is a smartphone application that is readily downloadable either from the provider of the system, a smartphone operating system provider etc. By installing in the mobile device memory 830 and running the designated application using the mobile device processor 890, the user of the mobile device 80 can properly credential the mobile device 80 by registering personal details (in particular, personal details of the user) using the mobile device input device 850 and the mobile device display 820.

The registered personal details can then be transmitted from the mobile device 80 to the server 90 using the mobile device transceiver 880. It is envisaged that the user may install and run the application and register personal details without physically being at the site that the user would like to visit. If required, the designated application may also allow the user of the mobile device 80 to select the site that the user would like to visit and accept any entry conditions specific to the site that the user would like to visit before the user visits the site. When the user of the mobile device 80 arrives on site with the mobile device 80 properly credentialed, the user can use the designated application at the terminal 30 to cause the mobile device display 820 to display an app screen comprising one or more designated images associated with the mobile device 80.

The camera 360 of the terminal 30 is configured to capture an image. Upon capturing an image of the app screen displayed by the mobile device 80, the terminal processor 380 automatically determines whether or not the captured image comprises the one or more designated images. That is, the terminal processor 380 determines from the captured image whether or not displayed app screen comprises any matching designated image or images based on one or more designated images associated with respective properly credentialed mobile devices. Depending on the embodiment, these designated images may be stored in the memory 330 of the terminal 30 locally or may need to be first retrieved by the terminal 30, for example, from the server 90.

If the processor 380 of the terminal 30 determines that there is an identifier matching a designated image, the processor 380 can control the terminal transceiver 380 to transmit sign-in information (for example, details of the visitor or the user of the mobile device 80) to the server 90. Depending on the implementation, the sign-in information may or may not include the personal details first input by the user of the mobile device 80 using the designated application. Also, the terminal 30 may control the terminal display 320 to display information advising the visitor to the site or the user of the mobile device 80 that sign-in of the visitor is in progress.

As indicated above, the server 90 comprises a transceiver 980. The transceiver 980 allows the server 90 to receive the sign-in information transmitted from the terminal 30. In response to receiving the sign-in information, the processor 990 of the server 90 can automatically generate an identifier for transmission to the terminal 30 for display to the user of the mobile device 80. In this embodiment of the server 90, the identifier is a random code that is generated by the server processor 990, but it is envisaged that the code may not be random in an alternative embodiment of the server 90. The random code generated by the server processor 990 can be transmitted from the server 90 to the terminal 30 using the server transceiver 980. In addition, the server 990 can also store information corresponding to the sign-in by the user of the mobile device 80 in the server memory 930. Depending on the implementation, the information stored in the server memory 930 may include the identifier or the random code generated by the server processor 90.

In response to receiving the identifier from the server 90 using the terminal transceiver 380, the processor 390 of the terminal 30 automatically displays the random code on the terminal display 320. It is envisaged that the random code may or may not be displayed with other information on the terminal display 30 depending on the embodiment of the terminal 30. For example, the random code may be displayed with information indicating to the user that the random code can be entered using the designated application in order to sign in on-site. The user of the mobile device 80 can then input the random code displayed on the terminal display 320 using the mobile device input device 850 through the designated application. In this respect, it is envisaged that an alternative implementation may involve the terminal display 320 displaying an identifier other than a random code, and that such an identifier can simply be scanned by the user of the mobile device 80 without requiring the user to manually enter the random code.

In response to the user inputting the random code using the designated application on the mobile device 80, the mobile device processor 890 can automatically transmit the random code input by the user to the server 90 using the mobile device transceiver 880. As indicated above, the transmission of the random code may be via cellular mobile data. The server processor 990 can then respond to the random code received from the mobile device 80 by determining whether or not the received random code matches with the random code stored by the server processor 990 in the server memory 930.

In response to the processor 990 of the server 90 determining that the received random code matches the stored random code, the processor 990 of the server 90 generates further sign-in information confirming that the user of the mobile device 80 has signed-in successfully in respect of the site and the further sign-in information is transmitted from the server 90 to the terminal 30 using the server transceiver 980. In this embodiment of the terminal, the terminal processor 390 can respond to the further sign-in information from the server 90 by recording the successful sign-in in the terminal memory 330 and displaying information in relation to the successful sign-in on the terminal display 320 for display to the user of the mobile device 80. It is envisaged that alternative embodiments of the terminal 30 may not store such information locally at the terminal 30 and may transmit the information elsewhere due to privacy concerns and rely on information relating to successful sign-ins stored remotely (such as at the server 90) if such information is required. Also, it is envisaged that information in relation to a successful sign-in might not be displayed by the terminal 30 but alternatively by the mobile device 80. In this respect, it is envisaged that in respect of an alternative embodiment of the terminal 30, both the terminal 30 and the mobile device may display successful sign-in information.

The server processor 990 is configured to generate a notification indicating that the random code input by the user of the mobile device 80 is incorrect and control the server transceiver 980 to transmit the notification to the mobile device 80 if the processor 990 of the server 90 determines that the received random code does not match the stored random code. Depending on the implementation, the server 90 may also generate and transmit to the terminal 30 an indication such that the terminal 30 can display to the user of the mobile device 80 that the sign-in is unsuccessful in respect of the site. In response to the notification, the designated application running on the mobile device 80 may prompt the mobile device user to decide whether or not the user would like to input a random code again. Depending on the implementation, the random code to be input again by the user may be the same random code previously displayed to the user by the terminal display 320 or alternatively be a new random code that is subsequently generated by the server processor 990 upon determining that the initially received random code does not match the stored random code. It is envisaged that the server processor may store information relating to each attempt of the user of the mobile device 80 to input a random code in the server memory 930.

It will be understood to persons skilled in the art of the invention that many modifications may be made without departing from the spirit and scope of the invention, in particular it will be apparent that certain functionalities of embodiments of the invention can be employed to form further embodiments including additional or alternative features to those described above.

For example, in an alternative embodiment of the terminal 30, the terminal 30 may not be (or at least may not only be) configured to capture a mobile device identifier such as a designated app screen displayed by the mobile device 80, and determine whether the displayed mobile device identifier matches a visual identifier. Instead, this alternative embodiment of the terminal 30 may be configured to control the terminal display 320 to display a terminal identifier such as a four-digit code that can be used for a single sign-in on-site. The processor 390 of this alternative embodiment of the terminal 30 may be also configured to control the terminal camera 360 to monitor whether any image captured by the terminal camera 360 comprises a visual identifier such as a designated QR code.

The designated QR code can be generated by the designated application installed on the mobile device 80. Accordingly, the user of the mobile device 80 may then use the designated application to generate and display the designated QR code as a form of "pre-check-in verification". Depending on the implementation, the mobile device user can type in or otherwise enter or input the four-digit code displayed by this alternative embodiment of the terminal 30 using the input device 850 of the mobile device 80 or using an input device (not shown) of the terminal 30 or of some other device. In this respect, it is envisaged that an implementation where the four-digit code is entered or typed in using the mobile device input device 850 is preferable to one where the four-digit code is entered or typed in using the terminal 30 in that the user need not contact or touch the terminal 30. It is envisaged that an embodiment of the terminal 30 may be configured to accept both such an implementation of a "contactless code" and a four-digit code that is entered directly using the terminal 30.

The processor 390 of this alternative embodiment of the terminal 30 is configured to determine whether or not the four-digit code input typed in by the user of the mobile device 80 corresponds to the terminal identifier displayed on the terminal display 320. The user of the mobile device 80 can be signed-in to a site upon the terminal 30 determining that the terminal identifier input by the user of the mobile device 80 matches the terminal identifier displayed by the terminal display 30 located at the site. In this alternative embodiment, the mobile device user must first display the designated QR code before inputting or in order to input the four-digit code displayed by the terminal 30. However, it is envisaged that the mobile device user may alternatively input the four-digit code before displaying the designated QR code in another implementation. It is envisaged that the four-digit code may be refreshed after every sign-in, or periodically depending on the implementation of this alternative embodiment of the terminal 30.

In another example, yet a further embodiment of the terminal 30 may rely merely on Bluetooth or some other form of electronic wireless detection (including via WLAN or Wi-Fi, and Radio Frequency Identification (RFID)) at the location of the site at which the terminal 30 is located to sign-in visitors to the site. In this further embodiment, the terminal 30 is configured to monitor at least one wireless channel in order to detect any wireless transmissions (or broadcasts) by the mobile device 80. Depending on the implementation, once a mobile device 80 is detected by way of its wireless transmission, the terminal 30 can then determine or identify the mobile device 80 either from the wireless transmission or from subsequent transmissions from the mobile device 80 to the terminal 30. In this respect, it is envisaged that one way of determining or identifying the mobile device 80 may be by searching through data on mobile devices that have previously been registered. Such data on mobile devices that have previously been registered may be stored by the server memory 930, the terminal memory 330, or both. For example, in one embodiment involving a plurality of terminals 30, the server memory 930 may store data on all mobile devices that have previously been registered for sign-in at all terminals 30 and each terminal memory 330 may store data on only mobile devices that have previously been registered for sign-in at that particular terminal 30. Thus, it is envisaged that alternative embodiments of the terminal 30 of FIGS. 1 and 2 may also involve alternative embodiments of the server 90 comprising additional or alternative features to those relating to the terminal 30 and the server 90 illustrated in FIGS. 1 and 2.

Yet another example may involve another form of proximity detection to those set out above, where Global Positioning System (GPS) coordinates (or some other form of geo-locality data on the location) of the mobile device 80 are used to confirm that the user of the mobile device 80 is present at the location of the terminal 30. For example, in one implementation, the GPS coordinates may be fed back from the mobile device 80 to the terminal 30 by embedding the GPS coordinates in the QR code that is generated by the designated application in the above-mentioned example of the alternative embodiment of the terminal 30. By feeding back the current GPS coordinates of the mobile device 80, the terminal 30 may either directly or indirectly via the server 80 confirm the presence of the mobile device 80 on-site at the location at which the terminal 30 is located in order to validly register a visitor sign-in.

It is to be understood that any reference to prior art made herein does not constitute an admission that the prior art formed or forms a part of the common general knowledge in the art in Australia or in any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated functionalities but not to preclude the presence or addition of further functionalities in various embodiments of the invention.

The invention claimed is:

1. A method of enabling sign-ins by a terminal in communication with a server located at a different location when compared to the terminal, the method comprising:
   in response to capturing a mobile device identifier displayed by a mobile device, wherein the mobile device identifier is unique to a user of the mobile device, determining whether or not the displayed mobile device identifier matches a visual identifier based on the captured identifier;
   upon determining that the displayed mobile device identifier matches the visual identifier, transmitting first sign-in information from the terminal to the server;
   in response to receiving a server identifier transmitted from the server, wherein the server identifier is generated by the server in response to receipt of the first sign-in information, displaying the received server identifier; and
   in response to receiving second sign-in information transmitted from the server, displaying a notification indicating a sign-in.

2. The method of claim 1, wherein determining whether or not the displayed mobile identifier matches the visual identifier comprises determining whether or not the captured identifier matches one of a plurality of visual identifiers corresponding to respective ones of a plurality of users.

3. The method of claim 1, wherein the second sign-in information comprises an indication of a successful login.

4. The method of claim 1, wherein a connection between the terminal and the server comprises a Wireless Local Area (WLAN) connection, a broadband connection, or a combination thereof, wherein a connection between the mobile device and the server comprises a Wireless Local Area (WLAN) connection, a broadband connection, or a combination thereof.

5. The method of claim 1, wherein the visual identifier comprises a Quick Response (QR) code.

6. The method of claim 5, wherein the QR code comprises a plurality of Global Positioning System (GPS) coordinates corresponding to a location of the mobile device.

7. A terminal comprising:
   a transceiver for communicating with a server located at a different location when compared to the terminal;
   a camera;
   a display;
   memory for storing a visual identifier; and
   a processor configured to:
   in response to the camera capturing a mobile device identifier displayed by a mobile device, wherein the mobile device identifier is unique to a user of the mobile device, determining whether or not the displayed mobile device identifier matches the stored visual identifier based on the captured identifier;
   upon determining that the displayed mobile device identifier matches the stored visual identifier, control the transceiver to transmit first sign-in information transmitted from the terminal to the server;
   in response to the transceiver receiving a server identifier transmitted from the server, wherein the server identifier is generated by the server in response to receipt of the first sign-in information, controlling the display to display the received server identifier; and
   in response to the transceiver receiving second sign-in information transmitted from the server, controlling the display to display a notification indicating a sign-in.

8. The terminal of claim 7, wherein the processor is configured to determine whether or not the captured identifier matches one of a plurality of visual identifiers corresponding to respective ones of a plurality of users.

9. The terminal of claim 7, wherein the second sign-in information comprises an indication of a successful login.

10. The terminal of claim 7, wherein a connection between the terminal and the server comprises a Wireless Local Area (WLAN) connection, a broadband connection, or a combination thereof.

11. The terminal of claim 7, wherein the visual identifier comprises a Quick Response (QR) code.

12. The terminal of claim 11, wherein the QR code comprises a plurality of Global Positioning System (GPS) coordinates corresponding to a location of the mobile device.

13. A server comprising:
   a transceiver for communicating with a terminal located at a different location when compared to the server;
   memory; and
   a processor configured to:
   in response to receiving first sign-in information transmitted from the terminal, generate a server identifier for storage in the memory and control the transceiver to transmit the generated server identifier to the terminal for display to a user of a mobile device configured to display a mobile device identifier matching to a visual identifier stored by the terminal, wherein the mobile device identifier is unique to the user of the mobile device;
   in response to the transceiver receiving an identifier transmitted from the mobile device, determine whether or not the received identifier matches the stored server identifier; and
   upon determining that the received identifier matches the stored server identifier, generating second sign-in information and controlling the transceiver to transmit the generated second sign-in information to the terminal.

14. The server of claim 13, wherein the second sign-in information comprises an indication of a successful login.

15. The server of claim 13, wherein a connection between the terminal and the server comprises a Wireless Local Area (WLAN) connection, a broadband connection, or a combination thereof, wherein a connection between the mobile device and the server comprises a Wireless Local Area (WLAN) connection, a broadband connection, or a combination thereof.

16. The server of claim 13, wherein the visual identifier comprises a Quick Response (QR) code.

17. The server of claim 16, wherein the QR code comprises a plurality of Global Positioning System (GPS) coordinates corresponding to a location of the mobile device.

* * * * *